Nov. 26, 1968 B. E. BRILEY 3,413,619
MAGNETIC MEMORY SYSTEMS EMPLOYING MYRIAPERTURE DEVICES
Filed Dec. 21, 1964 6 Sheets-Sheet 1

INVENTOR.
BRUCE E. BRILEY
BY
[signature]
ATTY.

INVENTOR
BRUCE E. BRILEY
BY C. A. Gulbrandsen
ATTY.

MAGNETIC MEMORY SYSTEMS EMPLOYING MYRIAPERTURE DEVICES

Filed Dec. 21, 1964 6 Sheets-Sheet 3

INVENTOR
BRUCE E. BRILEY
BY
ATTY.

MAGNETIC MEMORY SYSTEMS EMPLOYING MYRIAPERTURE DEVICES

Filed Dec. 21, 1964 6 Sheets-Sheet 4

INVENTOR
BRUCE E. BRILEY
BY
ATTY.

INVENTOR
BRUCE E. BRILEY
BY [signature]
ATTY.

MAGNETIC MEMORY SYSTEMS EMPLOYING MYRIAPERTURE DEVICES

Filed Dec. 21, 1964 6 Sheets-Sheet 6

INVENTOR
BRUCE E. BRILEY
BY C. G. Gulbrandsen
ATTY.

United States Patent Office 3,413,619

Patented Nov. 26, 1968

3,413,619

MAGNETIC MEMORY SYSTEMS EMPLOYING MYRIAPERTURE DEVICES

Bruce E. Briley, La Grange Park, Ill., assignor to Automatic Electric Laboratories, Inc., Northlake, Ill., a corporation of Delaware

Filed Dec. 21, 1964, Ser. No. 421,749

19 Claims. (Cl. 340—174)

ABSTRACT OF THE DISCLOSURE

Myriaperture magnetic cores are threaded by a plurality of windings to store data for serial or parallel readout. Strobe windings are employed to register the data read serially in parallel form or to separate parallel stored data. Mirror image storage and strobe windings and full-wave rectifiers provide reading capabilities during resetting of the cores to speed up system operation while the drivers employ a set-reset state memory to determine the polarity of the driver currents.

This invention relates to memory systems and in particular to myriaperture devices and to magnetic memory systems employing myriaperture devices as information storage media.

Generally speaking, magnetic memory systems which employ data storage devices, such as magnetic cores and magnetic wires, provide relatively small output signals which must be amplified, perhaps even preamplified, to a level capable of activating logic circuitry. Furthermore, restrictions, such as the impedance offered to a driver, prevents the electromagnetic association of a great number of elements with any single driving line. In other words, a single access drive usually provides the magnetic switching force for only a single or a few data words, one of said few words then being selected at the output of the memory. Prior art systems must therefore provide many drivers (or means for selectively connecting a few drivers to many drive lines), and means for amplifying the signals of the selected data word.

The present invention provides a memory system having a great number of data bits electromagnetically coupled to a drive line. Furthermore, the output signals of the selected data bits are of a magnitude sufficient to enable logic circuitry without the need of amplification.

Accordingly, it is a primary object of the invention to provide a new and improved magnetic memory system.

Another object of the invention is to provide a new and improved magnetic storage device.

Another object of the invention is to provide many data words for selection upon the request of a single access signal.

Another object of the invention is to provide output signals capable of activating logic circuitry without the need of amplification.

A feature of the invention resides in the particular configuration of the myriaperture storage device which is basically a flat circular disc having a rectanglar hysteresis loop and a plurality of apertures equidistantly spaced radially of a central aperture. Energization of a drive winding extending through the central aperture effects an outwardly travelling flux wave which progressively reverses the magnetic state of the bistable disc.

Another feature of the invention resides in a winding configuration which defines annular disposition of data words concentrically of the central aperture. As will be explained below, this configuration provides parallel readout of data words.

Another feature of the invention resides in a winding configuration which defines radial disposition of the words and, as will be fully explained below, provides serial readout of data words.

Another feature of the invention resides in a winding configuration like unto that just-mentioned which further provides a mirror image winding of each of the just-mentioned windings as a portion of means for doubling the reading speed of the memory.

Another feature of the invention resides in the use of apparatus for converting serial information to parallel information. In one instance shift register apparatus is employed for this purpose and in other instances, a series to parallel converter arrangement is employed.

Another feature of the invention stems from series to parallel conversion and includes various arrangements for providing an internally generated group of strobe (or timing) pulses which are synchronized with the rate of reading.

These and other objects and features of the invention will become apparent and the invention will be best understood from the following description taken in conjunction with the accompanying drawings.

GENERAL DESCRIPTION

Figure 1:
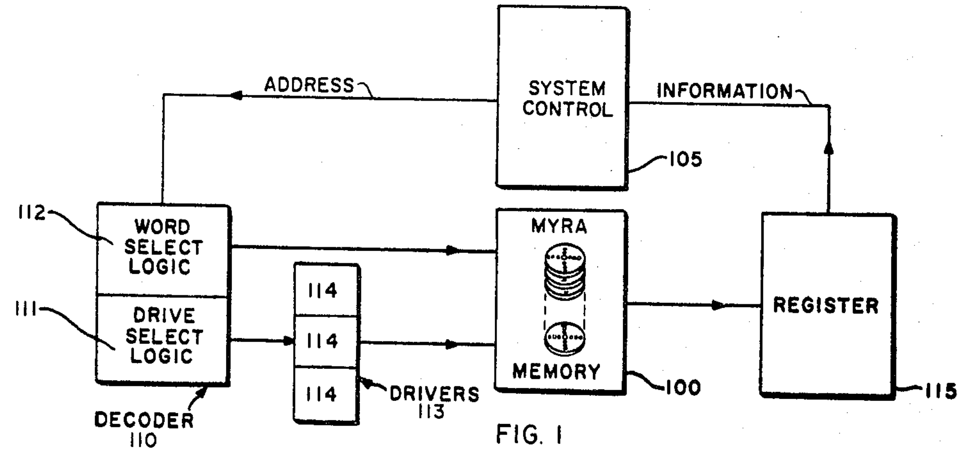
FIG. 1 is a functional block diagram of a myriaperture memory system.

FIG. 1 describes, in block diagram form, a general system layout for many types of memory systems. For simplicity the associated equipment has been shown as the system control 105 and performs, in particular, the logic to provide an address to the memory and the logic for controlling the system functions in accordance with the information extracted. The register 115 has been shown separate from the system control, but of course could be included therein. As just stated the system control provides an address to the memory. This address indicates the physical location of a particular data word and is broken down into two portions by the decoder 110. These two portions indicate which drive line is to be energized and which output gates are to be selected.

Referring to FIG. 1, a driver 114 of the driver group

113 is selected by the drive select logic 111 and the information of word location is transferred from driver 114 and word select logic 112 to the memory 100. The data read is then registered in register 115 for referral back to the system control 105. It should be noted that there are no sense amplifiers shown in FIG. 1.

Figure 2:
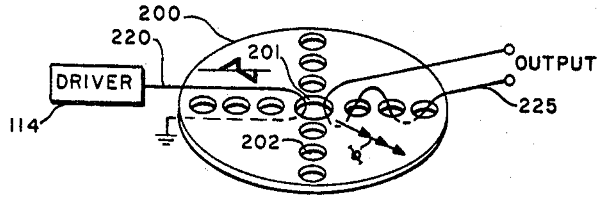
FIG. 2 is a schematic representation of an embodiment of the invention.

FIG. 2 describes a myriaperture disc 200 having a central aperture 201 and a plurality of other apertures 202. In FIG. 2, and hereinafter, the memory system will be described on a basis of four data bits per word. However, this is by way of nonlimitive example since many more data bits may be associated with an individual radius by providing either more apertures 202 or more windings 225. It is shown in FIG. 2 that the driver 114 is employed to energize the disc by way of drive line 220. An output or sense winding 225 is selectively threaded through the apertures 202 to code the disc and to sense the code upon magnetic switching as a series of pulses.

Figure 3:
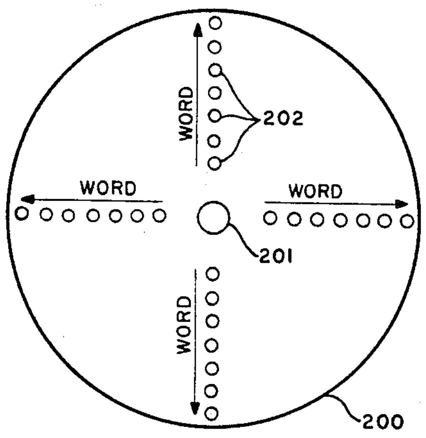
FIGS. 3 and 4 are diagrams showing radial and annular distribution of data words.

FIG. 3 graphically describes the distribution of data words radially from the center of the disc 200. Each radial alignment of apertures 202 provides, in this illustrative example, coding possibilities for a plurality of four bit words.

Figure 4:
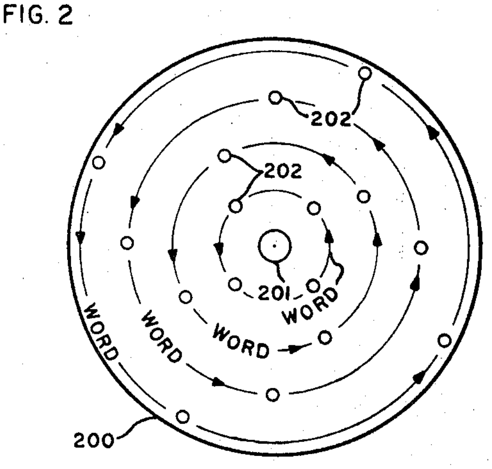

FIG. 4 is very similar to FIG. 3 with the exception that the distribution of data words is shown to be annular and concentric of the central aperture.

Figure 5:
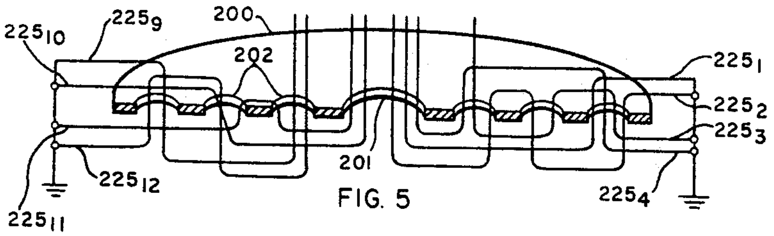
FIG. 5 is a schematic representation illustrating multiple word storage for each individual radius.

FIG. 5 describes a disc partially wired for serial readout of eight, four bit words. Each of these words is coded and sensed by conductors $225_1$–$225_4$ associated with the right hand radius of apertures and conductors $225_9$–$225_{12}$ associated with the left hand radius of apertures.

Figure 6:
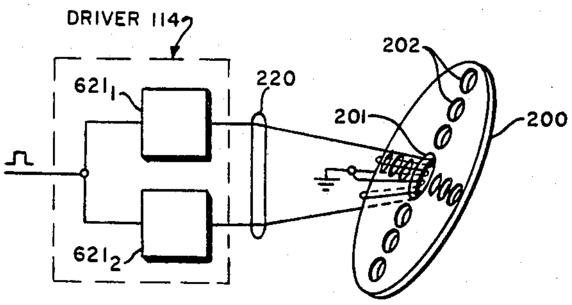
FIG. 6 shows apparatus for driving a myriaperture disc.

FIG. 6 shows a driver 114 broken down into two driving components, namely current source $621_1$ and current source $621_2$ which are linked to the disc 200 by conductors 220. An access pulse will cause first source $621_1$ to energize the disc with a positive going ramp to progressively switch the magnetic state of the disc and then source $621_2$ energizes the disc with a negative going ramp to progressively reset the disc to its previous state.

Figure 7:
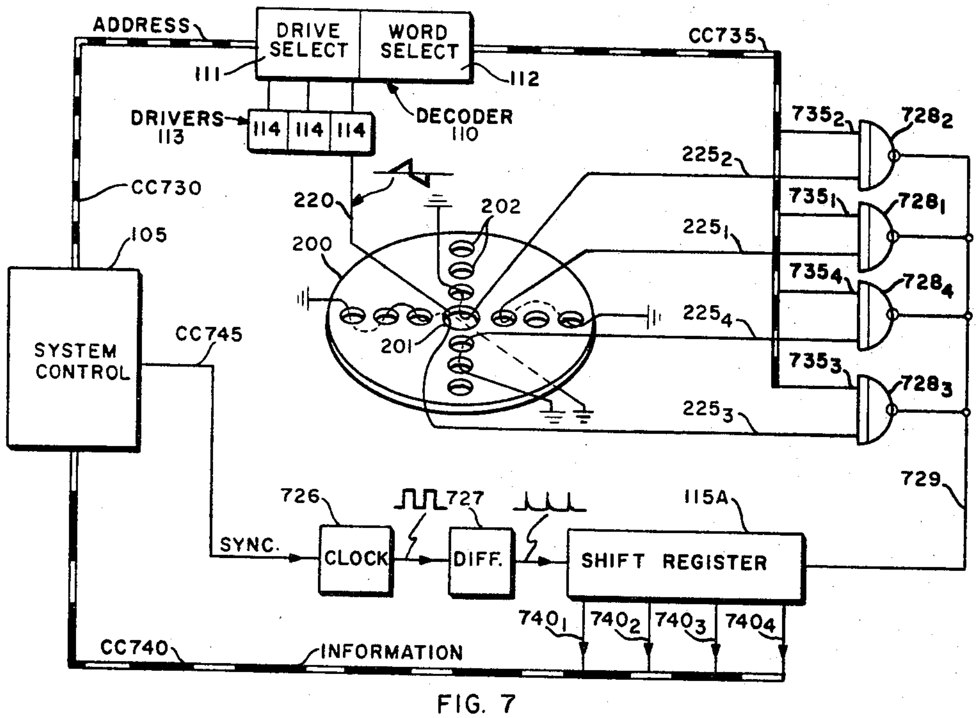
FIG. 7 is a schematic representation similar to FIG. 2 and further shows series to parallel conversion.

FIG.7 more completely describes a memory system of one disc having four, four bit words coded thereon. The system control 105 is connected to the decoder 110 by way of cable CC730. The decoder is connected on the one hand via the drive select logic 111, driver 114 and drive line 220 to the disc 200 and on the other hand via the word select logic 112 and control cable CC735 and its component conductors $735_1$–$735_4$ to the serial information gates $728_1$–$728_4$. The serial information gates each have an input from a sense winding $225_1$–$225_4$ which selectively thread the apertures 201, 202. The output of the serial information gates are commonly connected by way of connection 729 to the shift register 115A for series to parallel conversion. The shift register has a synchronized control from the system control via conductor CC745, clock 726 and differentiator 727 to provide shifting of information through the register so that parallel information is available at outputs $740_1$–$740_4$. The outputs of the shift register are then conveyed via cable CC740 to the system control to provide the required system functions.

Figure 8:
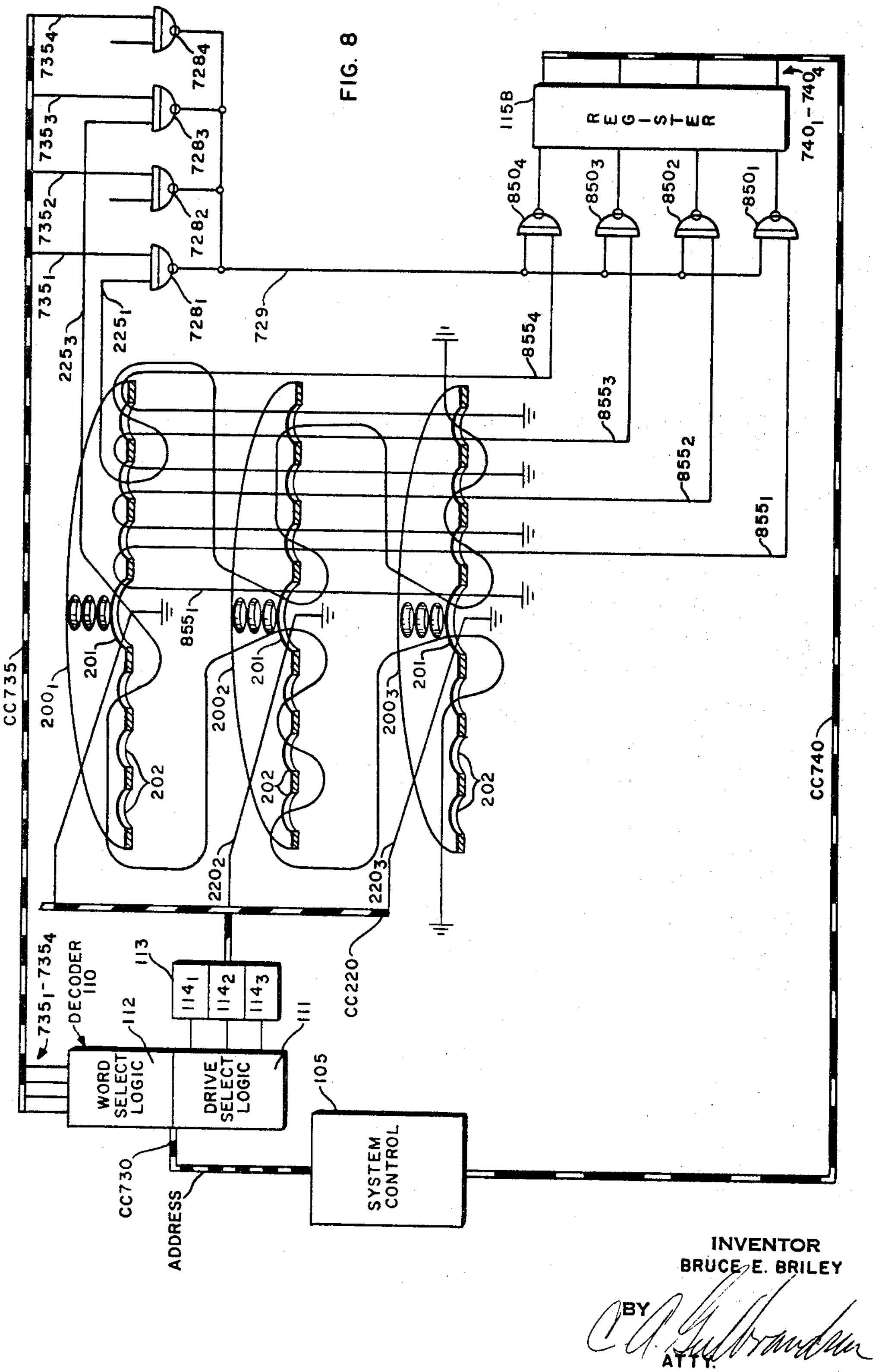
FIG. 8 is a schematic representation of an embodiment of the invention detailing a self-strobed memory.

FIG. 8 is an extension of FIG. 7 and similar elements of FIGS. 7 and 8 will not be further discused here. However, FIG. 8 describes a different technique for series to parallel conversion utilizing a register 115B which may comprise, in this illustrative embodiment, four bistable circuits as are well known in the art. Information is passed from the sense conductors $225_1$–$225_3$ to the serial information gates and by way of conductor 729 to a plurality of output gates $850_1$–$850_4$. Each of these output gates has an individual input from a different one of a plurality of strobe windings $855_1$–$855_4$. As will be understood from the description of operation, each of these windings in turn provides a strobe pulse for its associated output gate so that information is transferred from a serial time-oriented pattern into a parallel, spatial oriented pattern when information is finally registered. The remainder of FIG. 8 is very similar to FIG. 7 with the exception that it can now be seen that many words may be coded into a plurality of discs by a single sense winding 225 and while a great plurality of data bits may be electromagnetically associated with a single drive line, such as drive line $220_1$, only a single word is selected.

Figures 9, 10:
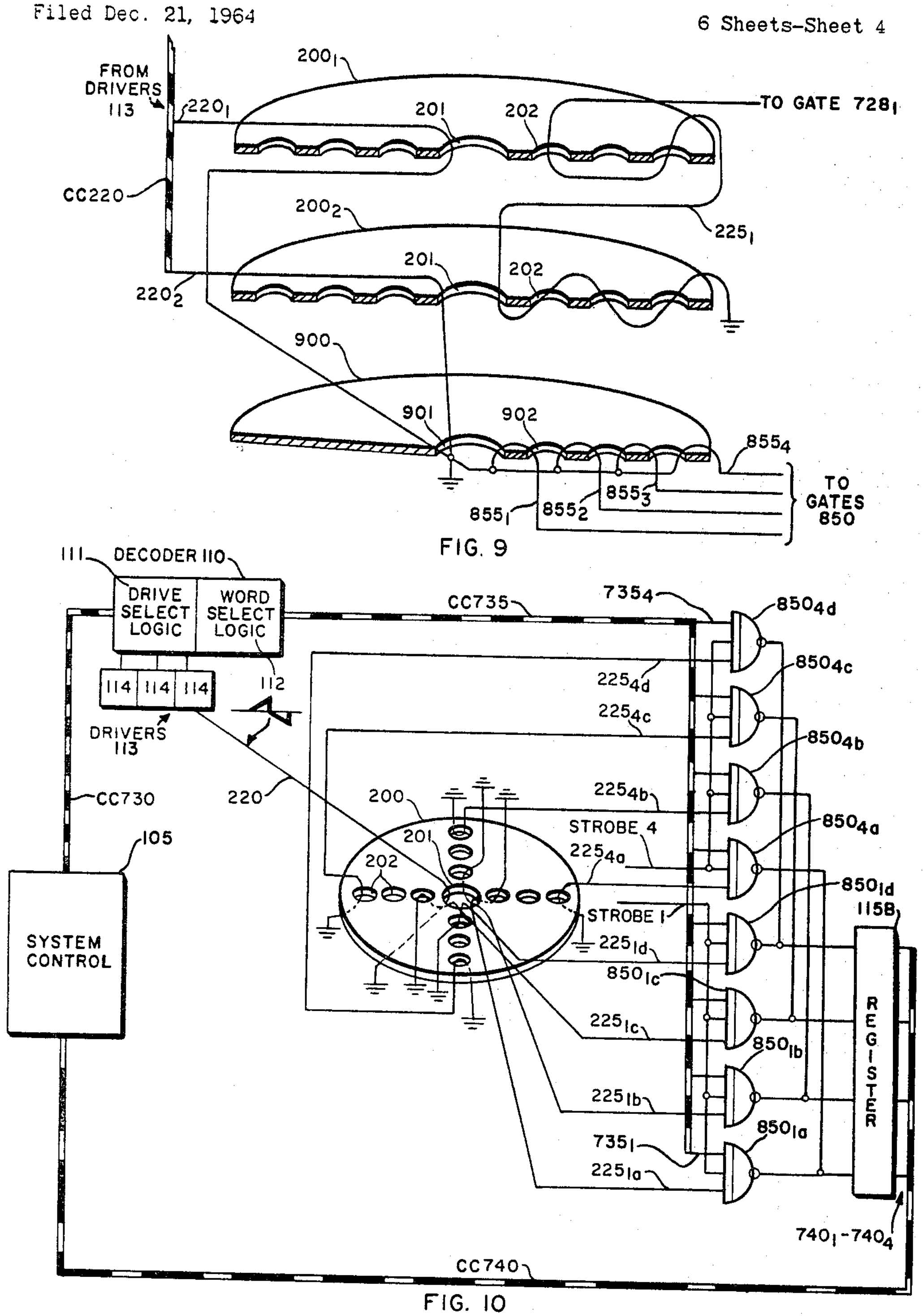
FIG. 9 is a schematic representation of an embodiment of the invention similar to FIG. 8, but showing the internally generated strobe by means of a strobe disc.
FIG. 10 is a schematic embodiment of the invention showing, on a small scale, parallel readout of information.

FIG. 9 describes another internally generated strobe by means of an additional disc 900 having a central aperture 901 and a plurality of other apertures 902 radially aligned therewith. Disc 900 need not have as many apertures as a disc 200, only one aperture per word bit for serial readout and one aperture per word for parallel readout, each including the central aperture. A plurality of strobe windings $855_1$–$855_4$ then provide the strobe pulses for gates 850 in a manner similar to that described in FIG. 8. It is shown that each drive line $220_1$, $220_2$ links its own individual disc 200 and also links disc 900 in series therewith. This provides that disc 900 is energized at the same time and with the same field strength as the information. However, disc 900 could also be separately accessed by a separate driver at the same time as any of the discs 200.

The memory system described by FIG. 10 is very similar to those described in FIGS. 7, 8 and 9 with the exception that each bit of a word requires an output gate $850_{1a}$–$850_{4d}$. The subscripts, such as $4d$, indicate the word, 4, and the bit, $d$. Only two words, word 1 and word 4 have been shown wired in FIG. 10. Associated with word 1 are windings $225_{1a}$–$225_{1d}$ and associated with word 4 are windings $225_{4a}$–$225_{2d}$. A strobe for the system has not been shown but has been indicated by the control lines marked strobe 1 and strobe 4. The coaction of a strobe and a signal on a word select line, such as $735_1$ or $735_4$, enable the proper gates 850 to register the information in register 115B. It will be seen in the operating description why is it necessary to have both a word selection signal and a strobe signal since this is not too clear in a small scale system as depicted in FIG. 10.

Figure 11:
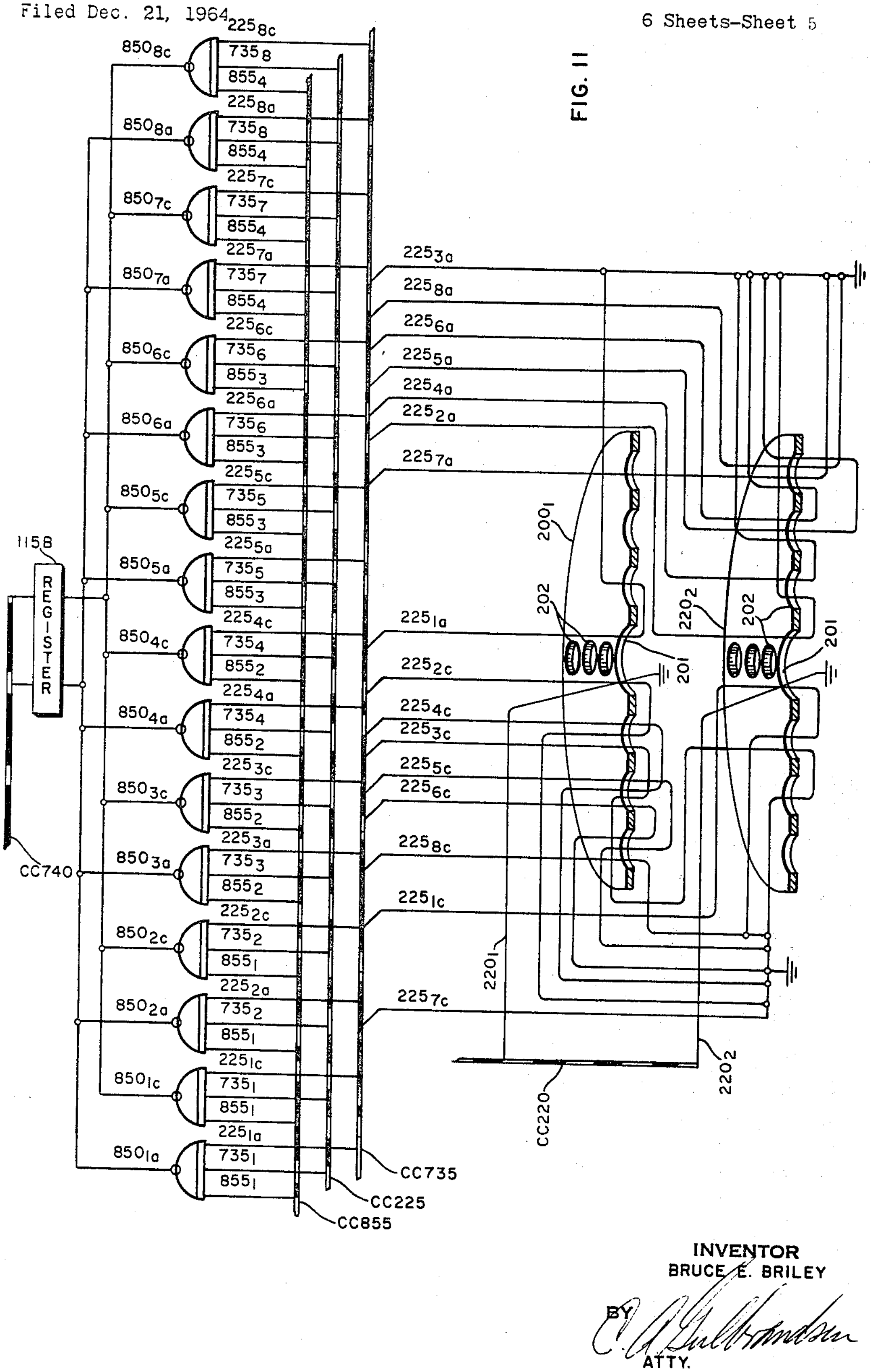
FIG. 11 is a schematic representation of an embodiment of the invention that is similar to FIG. 10 showing parallel readout of information in greater detail.

FIG. 11 is an expansion of FIG. 10 with more words and more bits per word as evidenced by the greater number of sense windings and will be explained in the operating description.

Figure 12:
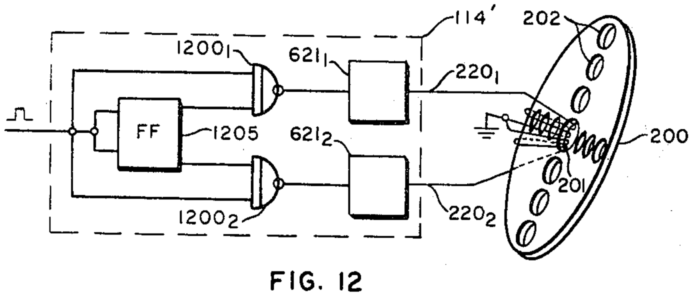
FIG. 12 is a schematic representation of a driver employed for doubling the readout speed of a disc.

FIG. 12 is similar to the FIG. 6 showing modified driver 114' for reversing the magnetic condition of a disc 200. Drivers $621_1$ and $621_2$ are similar to drivers $621_1$ and $621_2$ of FIG. 6; however, their enabling functions are somewhat different as evidenced by gates $1200_1$, $1200_2$ and the bistable device 1205. The bistable device 1205 and the two gates $1200_1$, $1200_2$ provide a status memory so that the memory disc 200 is read during the read portion of the cycle and again read during the reset portion of the cycle of a particular disc.

Figure 13:
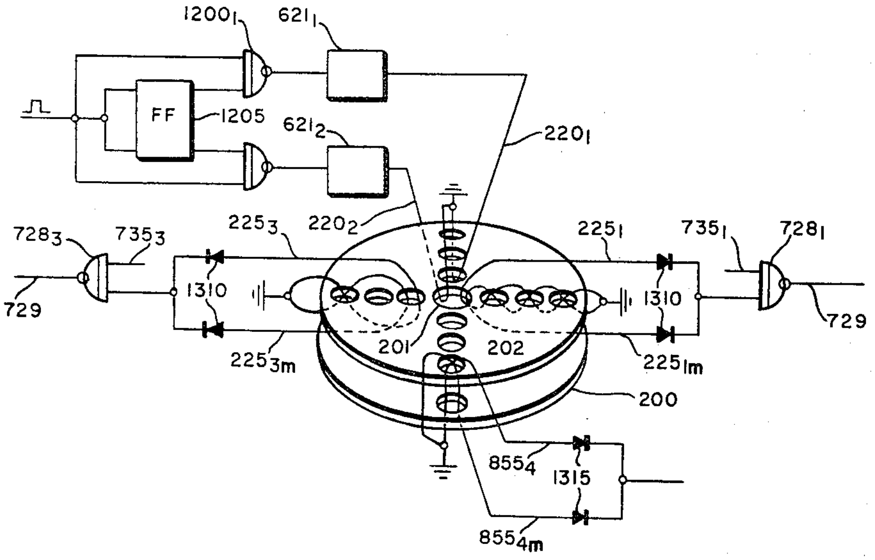
FIG. 13 is a schematic representation of an embodiment of the invention employing the driver of FIG. 12 and mirror image windings as means for doubling the reading rate of a memory disc.

FIG. 13 describes the apparatus of FIG. 12 and in addition describes the arrangement for reading a disc during both the read and reset portions of a memory cycle for a particular disc so that the memory cycle is cut in half. Winding $225_1$ has its mirror image in winding $225_{1m}$. Each of these windings are connected to an input of the serial information gate $728_1$ by way of the unilateral conducting devices 1310. A similar arrangement can be seen for sense winding $225_3$. For simplicity only one strobe winding $885_4$ and its mirror image $855_{4m}$ have been shown, since it is easily seen how the remainder of the strobe windings could be employed on this disc or as indicated, with a plurality of discs.

GENERAL OPERATION

For an annular ring or disc of magnetic memory is subjected to a current through its central aperture, it does not change its magnetic state instantaneously, nor do all parts of the material change state at the same time. Instead a flux wave propagates from the inner radius to the outer periphery at a speed which depends upon the type and quantity of material and the magnitude and shape of the current pulse. For uniform material, the shape of the propagating wave will be a circle concentric with the inner and outer boundaries. If the material is linear, the flux wave will propagate outward as the current increases, and will retreat inward as the current decreases. If the material has a square hysteresis loop, the flux wave will propagate outward as the current increases, but essentially no propagation will occur as the current decreases. If the current is increased in the negative sense a new wave front of opposite sense will propagate outward, and again no propagation will occur as the current becomes zero.

Since the disc 200 comprises a square loop ferrite material, flux wave propagation will be last-outlines. Referring to FIG. 2, assume that a driver 114 energizes the disc 200 by placing a positively going ramp on drive line 220. Drive line 220 is hereinafter shown as one line for simplicity. As flux begins to propagate from the central aperture 201 toward the periphery of the disc, the disc begins to progressively switch from one of its bistable states to the other. As each increment of material is switched to the opposite magnetic state a voltage is induced in the portions of the output winding 225 which include a switching increment within its loop. If we consider an inclusion of material within a loop as a binary 1 and an exclusion from the loop as a binary 0, we can see that in FIG. 2 the winding codes and senses the binary 1010 as a series train of pulses. It is therefore easily seen that many such windings can be put on each radius of a disc and all of the bits of each radius coded thereby are electromagnetically associated with a single drive line. This is indicated in FIG. 5. It can also be seen as shown in FIGS. 3 and 4 that information may be coded for serial or parallel readout by the inclusion or exclusion of the increments of material with sense windings 225. If the driver 112 of FIG. 2 now provides a negative going ramp a flux wave of opposite sense will propagate from the central aperture to the periphery of the disc and reset the disc to its first stable state. It will be shown later how this reset may be also employed for reading and thereby speeding up the operation of the memory.

By way of example, one experimental disc, one inch in diameter and six mils thick and having a coercive force of approximately 1.2 oersteds, provided output signals of 1.5 volts on a single turn when driven with a one ampere, two microsecond ramp which effected approximately 16 ampere-turns.

DETAILED DESCRIPTION

*Serial readout employing shift register.*—Turning to FIG. 7 assume that the system control 105 requests that the information stored in the right hand shown radius of disc 200 be interrogated. An address is sent by way of cable CC730 to the decoder 110 which performs the drive select and word select functions with its decoder portions 111 and 112. Driver 114 energizes drive line 220 with a positive going ramp to start interrogation. The word select logic 112 indicates by way of connection $735_1$ of cable CC735 that word 1 is to be registered.

The system control 105 also synchronizes the starting of clock 726 over conductor CC745 at the same instant that the driver energizes winding 220 and, by way of differentiator 727, provides the control pulses to shift the incoming information through the register 115A. The binary information 0110 stored by the sense conductor $\mathbf{225_1}$ is gated through gate $\mathbf{728_1}$ and passed by way of connection 729 to the input of shift register 115A where it is converted to parallel form on conductors $\mathbf{740_1}$–$\mathbf{740_4}$ for referral back to the system control by way of cable CC740. It can be seen that the data words 1000, 1010, and 0100 could have been read from disc 200 by selecting gates $\mathbf{728_2}$, $\mathbf{728_3}$, $\mathbf{728_4}$, respectively.

*Serial readout employing self-strobe windings.*—FIG. 8 describes a system similar to FIG. 7, but larger in capacity. Assume that word 3 is to be read from disc $\mathbf{200_2}$ that is associated with drive winding $\mathbf{220_2}$. In a manner previously described the system control 105 provides that the word select logic places an enabling signal on conductor $\mathbf{735_3}$ that is associated with gate $\mathbf{728_3}$. Also as previously described the system control 105 provides that a driver energizes drive line $\mathbf{220_2}$ by way of cable CC220. As the flux wave propagates outward from central aperture 201 of the selected disc the serial information 1010 is being placed on conductor 729 by way of gate $\mathbf{728_3}$. As the increments of material are reversing magnetic state for reading they are also reversing magnetic state for strobing by way of the strobe windings $\mathbf{855_1}$ to $\mathbf{855_4}$. Each of these strobe windings includes a corresponding increment of magnetic material on each of the discs and as a disc is progressively switched from one magnetic state to the other, corresponding strobe signals are sequentially placed on gates $\mathbf{850_1}$–$\mathbf{850_4}$ to gate the serial information into parallel information is advantageous over the use of a shift register with its shifting clock circuitry. Since the clock must start precisely with the ramp drive current, and since the rate of switching depends on the rate of change of the ramp, the ramp must always be of the same waveform with respect to the speed of the clock.

*Serial Readout Employing Strobe Disc.*—Referring now to FIG. 9, a different configuration for internally generating a strobe is shown. Assume that driver 113 energizes drive line $\mathbf{220_2}$ via cable CC220 and also energize disc 900 at the same time. As the flux wave propagates outwardly of the central aperture 201 the selected disc the binary information 1010 is placed on the sense winding $\mathbf{225_1}$ and will be gated through to the register via gate $\mathbf{728_1}$ as previously described. At the same time, another flux wave is propagating outwardly of aperture 901 as disc 900 is progressively switched from one stable state to the other. In a manner similar to that described for FIG. 8, strobe windings $\mathbf{855_1}$–$\mathbf{855_4}$ supply strobe signals to gates 850.

It will be noted that the tolerance of spacing between the apertures is more critical when employing the strobe disc than the self-strobe of FIG. 8 since each disc acts as its own strobe generator in FIG. 8 and a separate disc is employed to generate stroke signals in FIG. 9. However, the use of a strobe disc will save on overall wiring and wiring time in fabrication, and in cases where discs are to be replaced occasionally.

A modification could be made in FIG. 9 wherein each drive line 220 did not thread through the disc 900; the disc 900 then being energized by a separate drive line each time an information disc is accessed.

*Parallel readout.*—Turning to FIG. 10, a single disc memory system with parallel readout of four, four bit words is described. Only words 1 and 4 have been shown wired into the memory for clarity. Following the same type of access previously described assume that a driver 114 energizes drive line 220 to read from the disc and assume that the address had indicated that word 4 is to be read. Further assume that some type of strobing indicated by the leads referenced strobe 4 and strobe 1 is available. As the flux wave propagates from the central aperture toward the periphery of disc 200, the sense windings detect the progressive magnetic state reversals of the disc. When the state reversal reaches the outermost increment, the material which defines word 4, sense windings $\mathbf{225_{4a}}$–$\mathbf{225_{4d}}$ each sense, in this illustrative example, a 1 (code 1111) and supply these signals to gates $\mathbf{850_{4a}}$–$\mathbf{850_{4d}}$. Conductor $\mathbf{735_4}$ has been marked by the word select logic 112 over cable CC735 to coact with the strobe 4 pulse and the information on the sense windings to gate this parallel supplied information to register 115B.

From a simple one disc memory having only a few sense windings the importance of both the strobe and the word select markings is not readily apparent. Referring then to FIG. 11, only bits *a* and *c* of the eight, four bit words are shown wired into the two discs. Eight words of four bits each are implied, however, only two bits, *a*, *c* are actually shown wired into the memory. The following table describes each of the eight words with respect to the sense winding and the binary information coded thereby for bits *a* and *c*.

| Word | Windings | Code upper Disc | Code Lower Disc |
|---|---|---|---|
| 1 | $225_{1a}$, $225_{1c}$ | 10 | 01 |
| 2 | $225_{2a}$, $225_{2c}$ | 01 | 10 |
| 3 | $225_{3a}$, $225_{3c}$ | 01 | 01 |
| 4 | $225_{4a}$, $225_{4c}$ | 01 | 10 |
| 5 | $225_{5a}$, $225_{5c}$ | 01 | 10 |
| 6 | $225_{6a}$, $225_{6c}$ | 01 | 10 |
| 7 | $225_{7a}$, $225_{7c}$ | 10 | 10 |
| 8 | $225_{8a}$, $225_{8c}$ | 01 | 10 |

The memory described in FIG. 11 operates essentially the same as any previously described memory, however, it is easier to see the importance of the word select and strobe markings on any output gate. Assume that the system control has indicated by the address provided to the decoder that word 5 is to be interrogated from the lower disc $\mathbf{200_2}$. Accordingly, drive line $\mathbf{220_2}$ is energized with a ramp current and flux wave propagation begins outwardly of aperture 201 to switch the magnetic disc to its opposite stable magnetic state. It can be seen that winding $\mathbf{225_{5a}}$ encircles the material defining word 5 on the right hand portion of the disc and winding $\mathbf{225_{5c}}$ excludes the magnetic material defining word 5 from its loop. Therefore, bit *a* of word 5 will be read as a 1 and bit *c* of word five will be read as a 0 and fed via cable CC225 to the output gates $\mathbf{850_{5a}}$ and $\mathbf{850_{5c}}$. The word select logic 112 provides markings via cable CC735 and its conductor $\mathbf{735_5}$ to an input of gates $\mathbf{850_{5a}}$ and $\mathbf{850_{5c}}$. Each of these output gates now have two signals, the information signals and the word select signals, but to perform the AND function all inputs must be true. This is where the strobe is important in conjunction with the word select markings. The strobe, provided by self strobing or some clock mechanism is applied via cable CC855 and its conductor $\mathbf{855_3}$ to gates $\mathbf{850_{5a}}$, $\mathbf{850_{5c}}$, $\mathbf{850_{6a}}$ and $\mathbf{850_{6c}}$. Since during the time interval allotted for each strobe more than one word is energized, there must be a selection by the word select logic. All three inputs of the gates 850 associated with word 5 are true while some of the inputs associated with word 6 are true and some are not true. Therefore, the information, in this case 1 0 is gated through to register 115B.

*Speed doubling.*—Referring to FIG. 12 the driver of FIG. 6 has been modified to include two gates $\mathbf{1200_1}$ and $\mathbf{1200_2}$ and a bistable device 1205. Each time an input pulse to energize a driver is introduced into the driver the bistable device changes state. The AND function is performed between the input pulse and whichever output connection of the flip-flop is true or a binary one. It will be remembered that a positive going ramp will reverse the magnetic condition from a first stable magnetic state to a second stable magnetic state in the disc 200 and that a similar negative going ramp will have the opposite effect. However the sense windings will produce an opposite code to that threaded which is of no particular value. However, referring to FIG. 13 it can be seen that an additional mirror image winding will produce pulses in the same code pattern but of an opposite polarity. Therefore, diodes 1310 have been included to commonly connect at the input of serial information gate the output of two sense windings which are each a mirror image of the other. In this manner flux reversals during the first ramp may be registered as previously described and state reversals during what was normally the reset portion of the cycle may also be registered upon reset. With this configuration it is not necessary to reset a disc immediately after reading from the disc in order to be able to again read. The bistable device 1205 keeps track of the status of the disc and in accordance with that status provides the disc with either the positive or the negative ramp whenever a disc is to be accessed.

Assume that the driver select logic energizes the driver of FIG. 13 and the word select logic has chosen the word associated with gate $\mathbf{728_1}$ to be read. Accordingly the word select logic places a mark on conductor $\mathbf{735_1}$ for steering the information toward the register. Assume that the bistable device 1205 has been switched by the last previous input pulse so that the present input pulse in combination with the output of bistable device will enable gate $\mathbf{1200_1}$ and effect a current from source $\mathbf{621_1}$ to energize disc 200 via drive line $\mathbf{220_1}$. The flux wave propagates outward reversing the magnetic condition of disc 200. Binary information 1010 is sensed by conductor $\mathbf{225_1}$ and transferred through diode 1310 to a register (not shown) by way of gate $\mathbf{728_1}$. At the end of the input pulse from the driver select logic 111 (not shown) bistable device 1205 is switched to its opposite state.

Assume that the next address indicates that word 3 is to be read from the disc. Gate $\mathbf{1200_2}$ is now energized by the bistable circuit and the drive select pulse so that source $\mathbf{621_2}$ is effective to provide a field opposite to that previously provided. As the negative flux wave propagates outwardly of the central aperture the magnetic state of device 200 is reversed to its other magnetic state. This negative state reversal, normally the reset portion of the cycle, is sensed by winding $\mathbf{225_{3m}}$ and passed through diode 1310 to gate $\mathbf{728_3}$ for steering to a register.

It should be noted with the use of speed doubling the same winding techniques must also be employed by the strobe windings if the self strobe is to be utilized, and also, by the strobe windings of a separate strobe disc if the strobe disc is to be driven by the same drive line as the information disc.

What is claimed is:

1. A magnetic memory system comprising a bistable magnetic disc having a central aperture and a plurality of other apertures disposed equidistantly along a plurality of radii of said disc, each radius including the central aperture, means for providing a flux propagation outwardly of said central aperture to progressively reverse the magnetic state of said disc, a plurality of windings, each said winding being individual to a separate radius and selectively threaded through the apertures of the corresponding radius to code data, said plurality of windings sensing magnetic state reversals as coded serially occurring signals representing the data coded thereby, register means including a shift register, means for selectively providing said shift register with the coded signals sensed by said windings, and means for strobing said shift register in accordance with the rate of flux propagation of said magnetic disc.

2. A magnetic memory system comprising:

(a) a plurality of bistable magnetic discs, each of said discs having a central aperture and a plurality of other apertures equidistantly spaced along a plurality of radii of said disc;

(b) means for coding a plurality of data bits on each said disc, said means including a plurality of windings each linking selected ones of said apertures in signal transfer relationship;

(c) a source of addresses, each said address indicating the location of a separate portion of said plurality of data bits;

(d) decoder means, including driver means and selection means, operated in response to an address to connect selected ones of said windings to said register means and to progressively reverse the magnetic state of a selected one of said discs outwardly of its central aperture, the selected windings sensing one of the progressive state reversals as a group of pulses; and (e) means for registering said group of pulses.

3. A magnetic memory system comprising:

(a) a plurality of bistable magnetic discs, each of said discs having a central aperture and a plurality of other apertures equidistantly spaced along a plurality of radii of said disc;

(b) means for coding a plurality of data bits on each said disc, said means including a plurality of windings each linking selected ones of said apertures in signal transfer relationship;

(c) a source of addresses, each said address indicating the location of a separate portion of said plurality of data bits;

(d) register means;

(e) decoder means, including driver means and selection means, operated in response to an address to connect a selected one of said windings to said register means and to progressively reverse the magnetic state of a selected one of said discs outwardly of its central aperture, the selected winding sensing progressive state reversals as a series of pulses; and (f) means interposed between said register means and said plurality of windings for converting said series of pulses to a parallel group of pulses.

4. An arrangement for storing a plurality of data bits, said arrangement comprising a bistable magnetic device having a first aperture and a plurality of other apertures aligned therewith, winding means for coding information on said device including a first winding threading selected oes of said apertures and a mirror image winding threading said selected apertures in a sense opposite to that of said first winding, means for progressively setting and resetting said magnetic device between its stable states outwardly of the first aperture and along said aligned apertures, said first winding sensing progressive magnetic state changes due to setting as series of pulses, said mirror image winding sensing progressive magnetic state changes due to resetting as series of pulses of opposite polarity to the aforementioned series, means for reversing the polarity of pulses carried by said mirror image winding, and means for registering the pulses effected by the progressive state changes of said device.

5. A magnetic memory comprising:

(a) a plurality of bistable magnetic data storage discs each said disc having a central aperture and a plurality of other apertures equidistantly spaced along a plurality of radii of said magnetic disc;

(b) a bistable magnetic timing disc having a central aperture and a plurality of other apertures equidistantly spaced along a radius of said timing disc, the equidistant spacing of apertures being equal in all discs;

(c) means for selecting and reversing the magnetic state of a magnetic data storage disc and for reversing the magnetic state of said timing disc in coincidence therewith and at the same rate in each progressively outward from the respective central apertures;

(d) a first plurality of windings, each said winding being selectively threaded through selected apertures of a corresponding radius of each said data storage disc for sensing magnetic state reversals as a series sequence of signals;

(e) a second plurality of windings, each said second winding being inductively coupled to a separate portion of said timing disc along the radius defined by the apertures, each said second winding being energized in turn to provide a timing pulse during magnetic state reversals;

(f) means for registering data;

(g) means for selectively connecting a sense winding to said register means; and (h) means connected to said second plurality of windings and interposed between said register means and said selecting means and operated by the coincidence of said timing pulses and said series sequence of signals to convert said series sequence of signals to a parallel group of signals for registration.

6. A magnetic memory comprising:

(a) a plurality of bistable magnetic data storage discs, each said disc having a central aperture and a plurality of other apertures equidistantly spaced along a plurality of radii of said magnetic disc;

(b) a bistable magnetic timing disc having a central aperture and a plurality of other apertures equidistantly spaced along a radius of said timing disc, the equidistant spacing of apertures being equal in all said discs;

(c) means for selecting and reversing the magnetic state of a magnetic data storage disc and for reversing the magnetic state of said timing disc in coincidence therewith, and at the same rate in each, progressively outwardly from the respective central apertures;

(d) a first plurality of winding means, each said winding means including a first winding being threaded through certain ones of said apertures of a corresponding radius on each said storage disc and a second winding being threaded through the same apertures as a said first winding and in an opposite direction thereto to provide a mirror image of said first winding, said first winding sensing magnetic state reversals in a first direction and said second winding sensing magnetic state reversals in the opposite direction;

(e) unidirectional conducting means for each said first winding means, said unidirectional means connecting said first and said second winding thereof to a common terminal whereby the signal sensed by each said winding means are always of the same polarity at said common terminal;

(f) a second plurality of timing winding means, each said second timing means including a first timing winding and a second timing winding, said first timing winding being inductively coupled to a separate portion of said timing disc along the radius defined by the apertures, each said second timing winding being inductively coupled to the same separate portion of said timing disc as a mirror image of said first winding, said first timing winding being energized by magnetic state reversals of a first direction to provide a timing pulse of one polarity and said second winding being energized by magnetic state reversals of the opposite direction to provide a timing pulse of an opposite polarity;

(g) unidirectional conducting means for each second timing winding means, said unidirectional means connecting said first and second timing windings thereof to a common terminal whereby said timing pulses are always of the same polarity at said common terminal;

(h) means for registering data;

(i) means for selectively connecting said common terminals of said first winding means to said register means; and (j) means connected to each of said second timing winding means and interposed between said register means and said selective connecting means and operated by the coincidence of said timing pulses and said series sequence of signals to convert said series sequence of signals to a parallel group of signals for registration.

7. A magnetic memory system comprising a bistable magnetic disc having a central aperture and a plurality of other apertures spaced along a plurality of radii of said disc, each of the radii including the central aperture, means for progressively reversing the magnetic state of said disc outwardly of said central aperture, at least one winding for each said radius and selectively threaded through the apertures associated therewith to sense a progressive magnetic state reversal as a series of pulses in accordance with the threading of said winding, register means, means for selectively connecting said windings to said register means, and series to parallel converter means connected between said connecting means and said register means, said converter means comprising winding means linking said disc and energized by magnetic state reversals to provide a group of timing pulses, and means operated in response to said timing pulses in coincidence with said series of pulses for controlling said register means.

8. A magnetic memory system comprising a bistable magnetic disc having a central aperture and a plurality of other apertures spaced along a plurality of radii of said disc, each of the radii including the central aperture, means for progressively reversing the magnetic state of said disc outwardly of said central aperture, at least one winding for each said radius and selectively threaded through the apertures associated therewith to sense a progressive magnetic state reversal as a series of pulses in accordance with the threading of said winding, register means, means for selectively connecting said windings to said register means, and series to parallel converter means connected between said connecting means and said register means, said converter means comprising a plurality of timing windings on said disc, each of said timing windings being threaded through adjacent apertures of a radius and sequentially energized by said magnetic state reversals to produce a timing pulse, a plurality of gating means, each said gating means being connected to a separate one of said timing windings and operated by the coincident occurrence of a series signal pulse and the associated timing pulse to control said register means.

9. A magnetic memory system comprising a bistable magnetic disc having a central aperture and a plurality of other apertures spaced along a plurality of radii of said disc, each of the radii including the central aperture, means for progressively reversing the magnetic state of said disc outwardly of said central aperture, at least one winding for each said radius and selectively threaded through the apertures associated therewith to sense a progressive magnetic state reversal as a series of pulses in accordance with the threading of said winding, register means, means for selectively connecting said windings to said register means, said connecting means comprising a plurality of information gate means each including an input connection from a separate one of said sense windings, a control input adapted to receive an enabling signal, and an output commonly connected to like outputs of the other said information gate means, and series to parallel converter means connected between said connecting means and said register means, said series to parallel converter means comprising a plurality of individual timing windings linked to said magnetic disc and sequentially energized to produce timing pulses, and a plurality of converter gate means each including an input connected to the common output of said information gate means, an input connected to separate ones of said timing windings and an output connected to said register means, said plurality of converter gate means being sequentially operated by the signals of the selected sense winding and the corresponding timing pulse.

10. A magnetic memory system comprising a bistable magnetic disc having a central aperture and a plurality of other apertures spaced along a plurality of radii of said disc, each of the radii including the central aperture, means for progressively reversing the magnetic state of said disc outwardly of said central aperture, at least one winding for each said radius and selectively threaded through the apertures associated therewith to sense a progressive magnetic state reversal as a series of pulses in accordance with the threading of said winding, register means, means for selectively connecting said windings to said register means, and series to parallel converter means connected between said connecting means and said register means, said converter means comprising means for generating timing pulses including another bistable magnetic disc having a central aperture and a plurality of other apertures spaced apart along a radius of said disc, said spacing being equal to the spacing of the apertures of the first-mentioned disc, means for progressively reversing the magnetic state of said other disc outwardly of said central aperture coincidently with and at the same rate as that of the first-mentioned disc, and a plurality of windings linking said other disc by threading the apertures thereof, said plurality of windings being sequentially energized by magnetic state reversals of said other disc to produce said timing pulses.

11. A magnetic memory system comprising a bistable magnetic disc having a central aperture and a plurality of other apertures spaced along a plurality of radii of said disc, each of the radii including the central aperture, means for progressively reversing the magnetic state of said disc outwardly of said central aperture, at least one winding for each said radius and selectively threaded through the apertures associated therewith to sense a progressive magnetic state reversal as a series of pulses in accordance with the threading of said winding, register means, means for selectively connecting said windings to said register means, said connecting means comprising a plurality of information gate means each having an input connection from a separate one of said sense windings, a control input adopted to receive an enabling signal, and an output commonly connected to like outputs of the other information gate means, and series to parallel converter means connected between said connecting means and said register means, said series to parallel converter comprising a plurality of converter gate means each having an input from the commonly connected outputs of said information gate means, a timing pulse input, and an output connected to said register, a second bistable magnetic disc having a central aperture and a plurality of other apertures spaced along a radius of said disc, said spacing being equal to the spacing along the radii of the first-mentioned disc, means for progressively reversing the magnetic state of said second disc outwardly of the central aperture thereof in coincidence with and at the same rate of reversal as that of the first-mentioned disc, and a plurality of timing windings individually linking the second disc by threading the apertures thereof, said timing windings being individually connected to the timing pulse inputs of said converter gate means and sequentially energized by the progressive magnetic state reversals of said second disc to provide timing pulses to said converter gate means.

12. A magnetic memory system comprising a bistable magnetic disc having a central aperture and a plurality of other apertures equidistantly spaced along a radius of said disc, means for progressively conditioning said disc from either of said stable states to the other of said stable states, and sensing means including at least one pair of windings each of which is inductively coupled to said disc and each threading selected ones of said apertures in directions opposite to the other, one winding storing data and the other winding storing the compliment of said data, said sensing means detecting the progressive state reversals always as the same serial pulse train representing said data regardless of the direction of state reversal.

13. The magnetic memory system according to claim 12 wherein said sensing means comprises a first winding selectively threading said selected ones of the apertures, a second winding selectively threading said apertures as a mirror image of said first winding, and diode means connecting said first and second windings to a common output terminal whereby said first winding and said diode means provides said serial pulse train at said common output terminal for magnetic state reversals of one direction and said second winding and said diode means provides an identical serial pulse train at said common output terminal for magnetic state reversals of the opposite direction.

14. The magnetic memory system according to claim 12, wherein said progressive conditioning means comprises drive winding means inductively coupled to said disc, first and second driver means connected to said drive winding means for effecting oppositely directed magnetic fields at said drive winding means, a source of access signals, bistable means operated between stable states on each access signal, said first and second driver means being selectively enabled in accordance with the state of said bistable means.

15. The magnetic memory system according to claim 14, and further comprising gate means interposed between said two driver means and said bistable means, said gate means being operated by an access signal and said bistable means to energize one of said two driver means.

16. A magnetic memory system comprising:

(a) a plurality of bistable magnetic discs, each said disc having a central aperture and a plurality of other apertures spaced apart equidistantly along a plurality of radii of said disc;

(b) means for selecting and progressively reversing the magnetic state of a disc outwardly from the central aperture;

(c) a first plurality of windings, each said first winding being threaded through certain ones of said apertures of a separate radius on each said disc, each said first winding sensing magnetic state reversals as a serial sequence of signals;

(d) a second plurality of windings, each said second winding being associated with a separate first winding and threaded through the same apertures as its associated first winding and in an opposite direction thereto to provide a mirror image of said first winding, each said second winding sensing magnetic state reversals as a mirror image of the signals sensed by its associated first winding;

(e) a unidirectional conducting means connecting each said first winding and the associated second winding to a common output terminal whereby said serial sequence of signals is always of the same polarity;

(f) series to parallel converter means;

(g) means for selectively connecting a common output terminal to said converter means; and (h) means for registering said sensed signals.

17. The memory system according to claim 16, wherein said series to parallel converter means comprises a plurality of timing winding means, each said timing winding means including a first winding threaded through corresponding apertures of each said disc and a second winding threaded through the same apertures as said first winding as a mirror image thereof, each said first and second windings providing a timing pulse in response to magnetic state reversal of a portion of a disc linked thereby, and unidirectional conducting means connecting said first and second windings to said gating means for providing said timing pulses in the same direction regardless of the direction of magnetic state reversal.

18. The memory system according to claim 16, wherein said means for selecting and progressively reversing the magnetic state of a magnetic disc comprises decoder means adapted to receive address signals and operated thereby to provide a drive access signal indicative of the received address, winding means on a selected disc, and means, including a bistable circuit, for energizing said winding means.

19. The memory system according to claim 18, wherein said bistable circuit is operated by each access signal, and further comprising driver means for providing said winding means with a magnetic field of one direction or the other and operated by said access signal to energize said winding means in accordance with the state of said bistable circuit.

References Cited

UNITED STATES PATENTS

| | | | |
|---|---|---|---|
| 2,814,792 | 11/1957 | Lamy | 340—174 |
| 2,944,249 | 7/1960 | Kuntzleman | 340—174 |
| 2,992,415 | 7/1961 | Bauer | 340—174 |
| 3,017,518 | 1/1962 | Hanysz | 340—174 |
| 3,108,194 | 10/1963 | Weller | 340—174 |
| 3,155,960 | 11/1964 | Bockemuehl | 340—174 |
| 3,290,664 | 12/1966 | Hsueh et al. | 340—174 |

BERNARD KONICK, *Primary Examiner.*

V. P. CANNEY, *Assistant Examiner.*